United States Patent [19]

Gabilondo

[11] Patent Number: 5,452,780
[45] Date of Patent: Sep. 26, 1995

[54] PNEUMATIC BRAKE-CLUTCH

[75] Inventor: Francisco L. Gabilondo, Anzuola, Spain

[73] Assignee: Goizper, S. Coop. Ltda., Anzuola, Spain

[21] Appl. No.: 161,653

[22] Filed: Dec. 2, 1993

[30] Foreign Application Priority Data

Dec. 2, 1992 [ES] Spain ................................ 9202452

[51] Int. Cl.⁶ .................................................. F16D 67/04
[52] U.S. Cl. ............................................ 192/14; 192/18 A
[58] Field of Search ........................ 192/18 A, 14, 192/16, 15, 12 C

[56] References Cited

U.S. PATENT DOCUMENTS

| | | | |
|---|---|---|---|
| 3,200,917 | 8/1965 | Herr et al. | 192/18 A |
| 3,469,664 | 9/1969 | Ortinghaus et al. | 192/18 A |
| 3,727,731 | 4/1973 | Selig | 192/18 A |

*Primary Examiner*—Rodney H. Bonck
*Attorney, Agent, or Firm*—Helfgott & Karas

[57] ABSTRACT

A brake-clutch assembly applicable as a safety element in machines having a start-stop movement, such as presses, shears and the like, has a hub which is to be mounted on a machine shaft and a brake-side cover having a cylindrical part defining a cylindrical cavity for admitting compressed air. A friction disc is mounted on the cylindrical part. The hub also carries a central piston-plate which supports two rings having frictional linings on both the brake side and the clutch side. The inner diameter of the cylindrical part is considerably larger than the inner diameter of one of the locking rings, thereby allowing a maximum power to be achieved because the cylindrical cavity defining a pressure chamber can be extended to attain a diameter close to that of the friction disc. This is achieved by removing the material in an area of the central piston-plate.

4 Claims, 2 Drawing Sheets

PNEUMATIC BRAKE-CLUTCH

BACKGROUND OF THE INVENTION

The invention relates to an improved pneumatic brake-clutch, of the kind used in driving machines with start-stop movement, such as presses, cutters and so forth, in which the brake-clutch works as a safety element, for braking in the same takes place in the absence of air pressure and hence any failure in the supply of compressed air shall cause previously compressed springs to disconnect and brake the machine.

The improvements of the invention applicable to the aforesaid type of pneumatic brakes-clutches primarily focus on a new arrangement in mounting the discs that rub against the linings in order to improve the braking torque that is known to be a result of the pneumatic pressure supplied, the piston surface and the friction coefficient of the linings. Thus, since the friction linings available in the market are very specific and the network pneumatic pressure is also specific, the invention allows the piston surface or, in other words, the diameter of the cylinder in which it works to be increased, to yield brakes-clutches with a braking strength or torque greater than others of similar dimensions in the market.

The brakes-clutches that are used in machines such as presses, shears and the like generally comprise a central cylindrical and substantially flat body that is mounted upon the relevant axis that is to be driven-stopped, mounting taking place with the assistance of cotter pins, locking rings and so forth.

The central body in turn comprises two side covers that are positively fixed to each other through the central hub used for coupling to the shaft, and a vertical intermediate plate that turns with the covers, but having axial movement, propelled on one side by springs that rest on one of the covers and drive the same towards the facing cover, whereas in the opposite direction a piston positively fixed to the same central plate acts to provide such axial movement, all so that combined with a cylinder positively fixed to the adjacent cover the same is strongly displaced when compressed air enters into the cylindrical cavity, the resulting effort being powerful enough to overcome the spring force thereby to press the central plate against the facing cover.

Close to one of such covers, inside the central body as such and projecting from the periphery thereof, there is a ring carrying friction linings, which ring is fixed to the machine casing, the area with linings lying between the brake cover and the central plate, so that in the absence of air pressure the ring shall be locked between the two, holding the brake-clutch and the shaft it controls still.

Similarly, another ring carrying friction linings is positively fixed to the machine driving wheel, lying between the central plate and the cover on the side of the clutch, so that when the cylinder cavity is filled with compressed air, the pressure shall move the central plate, overcoming the spring force and causing the brake to be freed, pressing at the same time the lining on the ring positively fixed to the wheel, causing by friction the clutch-brake and the shaft positively fixed to the same to be started, at the same speed as the driving wheel.

Now then, these brake-clutches, having a diameter that is larger than their length, and driven by a single ring with linings on the brake side, and a ring on the clutch side, have a number of disadvantages and problems for, bearing in mind that the coefficient of friction of the linings is of a magnitude that is standard in the market and that the air pressure available in garages generally is also standard, if the diameter of the clutch-brake is the same, the only possibility there is of improving the torque is increasing the cylinder section. Heretofore, for a given diameter of the central body, the brake-clutch was provided with rings with linings the diameters of which at the friction area were: the largest, equal to the outer diameter of the central body; and the smallest, as large as possible bearing in mind that the circular ring lying between the two must have a surface such that the specific pressure on the linings lie within the pressures recommended by their manufacturer.

Furthermore, the outer diameter of the cylinder and the respective piston are at most equal to the smallest diameter of the lined ring, and it is hence possible for the friction surface of the cover on the brake side to reach out to the linings as such.

It must also be borne in mind that these brake-clutches are fixed to the shaft usually by means of cotter pins and the arrival of driving air takes place through the center of the shaft, communicating with transverse holes that meet matching holes on the brake-clutch. Now then, the cotter pins need a very accurate adjustment, and yet they are prone to become loose because of the start-stop operation of the assembly. In addition, as the air ducts have to be impervious, outer discs have to be provided that carry sealing gaskets, thus complicating mounting.

SUMMARY OF THE INVENTION

The object of the invention is to make a number of improvements in the aforesaid type of the brake-clutch, to solve the above problems and obtain the following benefits:

1. Increasing the clutch torque, using a simple and efficient solution, which comprises increasing the cylinder diameter beyond the smallest diameter of the lined ring.
2. Allowing the use of locking rings at both the clutch and the brake sides.

The first benefit or improvement, viz. increasing the clutch torque by increasing the diameter of the cylinder beyond the smallest diameter of the ring with linings is achieved obtaining the friction disc of the brake side cover by mechanizing and eliminating part of the material of the cast element making up the central piston-plate, overcoming the material mounting impossibility existing in conventional brakes-clutches.

The possibility of using locking rings on the brake side is achieved by merely widening as much as possible the thicker part of the hub on the clutch side cover, eliminating the traditional transverse holes allowing air in, which are replaced with a battlement at the joint between both covers, thereby narrowing the piston and leaving space for the said extension of the thicker part of the hub.

Another improvement lies in that transmission of the torque from the central piston plate to the hub takes place by radial ribs assembling and alternately crossing with other radial ribs forming part of the clutch side cover.

BRIEF DESCRIPTION OF THE DRAWINGS

In order to provide a fuller description and contribute to the complete understanding of the characteristics of this invention, a set of drawings is attached to the specification which, while purely illustrative and not fully comprehensive, shows the following:

FIG. 2 is a plan view of the portion having a smaller diameter corresponding to the central hub, fitted with the appropriate merlons allowing air in.

DESCRIPTION OF THE PREFERRED EMBODIMENT OF THE INVENTION

Figure 2:
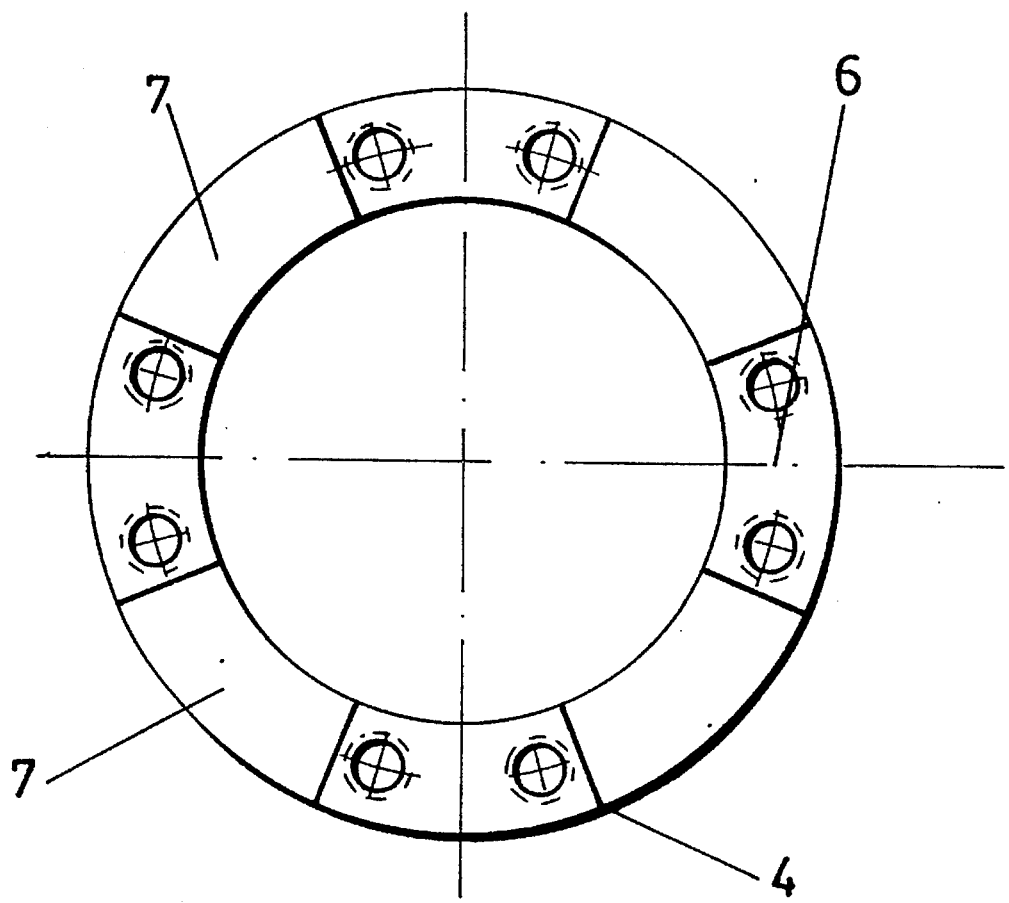

The above figures show that the brake-clutch is provided to be mounted on the respective shaft (1) of the machine at issue, the same being mounted through a hub (2) inserting a locking ring (3), which hub (2) has two clearly distinct parts, one having a larger diameter and that is deemed as the thick part, bearing precisely reference number (2), and a part of smaller diameter that is an axial extension of the previous part, bearing reference number (4), being particular in that the area of smaller diameter is provided with a battlement (5) comprising projections (6) alternating with recesses (7), as shown clearly in FIG. 2, the brake side cover (11) being fixed to the said projections (6). The battlement (5) formed by the alternating projections (6) and recesses (7) allow air in. The sealing and connection cover (8) is mounted inserting respective sealing gaskets (9).

Figure 1:
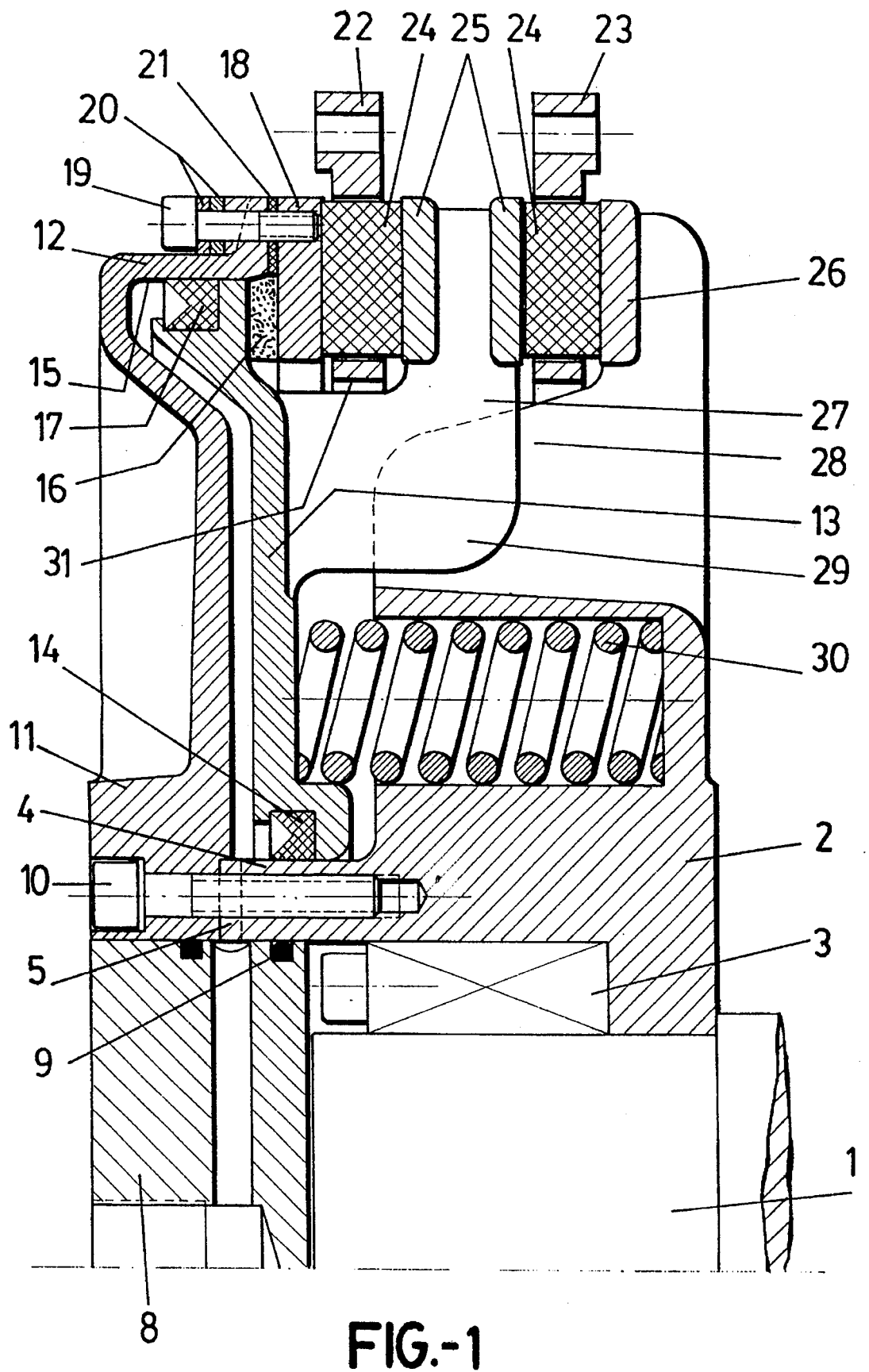
FIG. 1 is a cross-section of part of the pneumatic disc-clutch subject of the invention.

As aforesaid, the respective brake side cover (11) is mounted using screws (10) on the hub (2) and in particular on the portion (4) that is deemed to have a lesser thickness, the periphery of the cover forming a cylindrical portion (12) the inner diameter of which supports the periphery of a central piston-plate (13) comprising a single piece and that is mounted upon the hub (2) portion or area (4) of lesser thickness through a slip-joint (14). This central piston-plate (13) has an area or part matching the inner diameter (15) of the cylinder (12) and another area or part of larger diameter in the discs (25), both areas being joined to each other through a central area that can be ribbed, and the external diameter of which is much smaller than the previous diameters, the central area locking a friction disc (18) of external diameter equal to the maximum body diameter, whereas the inner diameter is somewhat larger than the outer diameter of the central area. The part (16) shown in FIG. 1 as a dotted area is mechanized by removing material.

Between the Central piston-plate (13) and the inner surface of the cylindrical part (12) of the cover (11) there is provided a slip-joint (17) whereas the outer edge leading from the actual cylindrical part (12) is fixed with the friction disc (18) of the brake side cover, (11) the disc (18) being fixed or mounted with screws (19) and by inserting platelets (20) compensating for wear, whereas between the said friction disc (18) and the actual edge of the cylinder part (12) there are provided insulating platelets (21). Furthermore, respective brake side and clutch side rings (22) and (23) carrying linings (24) are respectively provided, the linings and the central discs forming part of the central piston-plate (13) being numbered (25), and the clutch side cover disc being numbered (26).

It has also been provided that the central piston-plate (13) includes radial wings (27) and the clutch side cover includes radial rings (28) which cross each other at the areas numbered (29).

Springs (30) have also been provided, located between the hub (2) and the central piston-plate (13), to work as mentioned above.

Now then, in the light of this construction and as shown in the figures, it can be seen that the inner diameter (15) of the cylindrical part (12) is much larger than the inner diameter (31) of the brake side ring (22), thereby enhancing the cylinder section and hence the torque.

The friction disc (18) can be obtained by removing the dotted portion (16) by mechanizing the same, for the portion (16) was provided upon casting an integral part of the friction disc (18) and the rest of the piston-plate (13) assembly. Now then, after mounting this assembly with the slip-joint (17) on the brake side cover (11), the said friction disc (18)is screwed to the latter with screws (19) and insulating platelets (21) are inserted. On the rear portion and held by the same screws are wear compensation platelets (20) that shall upon such wear be transferred successively from the current position to a position adjacent to the insulating platelets (21), thereby controlling displacement of the central disc (25) and compensating for wear of the friction linings (24).

The central piston-plate (13) is both on connection and on braking, provided with the torque transmitted by the respective clutch or brake ring, which torque must be transmitted to the thicker portion of the hub (2) that is positively fixed to the shaft (1) of the machine, such transmission taking place through the radial wings (27) that cross at their aforesaid part (29) with the radial wings (28), which wings moreover house the actual piston-plate (13) and the central discs (25) forming a single piece and fully refrigerated throughout.

The clutch side cover disc, numbered (26) is further assembled with the thicker part of the hub (2) through the radial wings (28), also receiving and transmitting the central disc torque.

The improvements of the invention therefore provide a large and strong hub to be internally fitted with a locking ring (3) mounted both from the clutch cover portion and from the brake portion, so that to achieve a maximum width for such hub (2), the relevant size of the part enveloping the slip-joint (14) is minimized and the part corresponding to the thickness where the air inlets (5) are provided is also minimized, the latter inlets being provided as channels on the hub front, where it joins the brake side cover, in lieu of the traditional communicating holes.

We feel that there is no need to extend the description any further for an expert in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. In a pneumatic brake-clutch assembly comprising a central hub (2) fixed to a shaft (1) of a machine to be driven; two side covers joined by said central hub to each other, one of said side covers being a clutch side cover (26–28) and another of said side covers being a brake side cover (11), said brake-side cover (11) being provided on a circumference thereof with a cylindrical portion (12) defining a pneumatic drive cylinder; a first friction disc (18) positioned at said cylindrical portion (12) on a brake side of the assembly, said clutch side cover (26–28) including a second friction disc (26) positioned on a clutch side of the assembly; a central piston-plate (13); springs (30) supported between said hub and said central piston-plate, said brake-side cover (11) with said cylindrical portion (12) thereof enclosing a cylindrical cavity for receiving compressed air therein; a first ring (22) having friction linings (24) and being fixed to a machine casing on the brake side and having two facing flat surfaces; a second ring (23) on the clutch side and having friction linings (24) and being fixed to a drive wheel of the machine; said hub (2) having a substantially narrower axial section (4) on which said central piston-plate (13) is mounted so as to slide thereon sideways in one direction under action of said springs (30), and to slide in an opposite direction under action of the compressed air entering the cylindrical cavity enclosed by said brake-side cover (11) with said cylindrical portion (12) thereof, a sliding movement of said central piston-plate in said one direction causing braking of the shaft by locking between the two facing flat surfaces of said first ring (22), whilst the sliding movement of said central piston-plate in said opposite direction causes connection to the drive wheel by locking the second ring (23), said first friction disc (18) on the brake side being screwed to said cylindrical portion (12), the improvement comprising said central piston-plate (13) having two portions, one portion being narrower than another portion and making up a piston, said one portion being located within said cylindrical portion (12) and having a central area, said another portion being separated from said one portion and including two central discs (25), an inner diameter of said cylindrical portion (12) being greater than an inner diameter of said first ring (22), said first friction disc (18) being mounted between said one portion and said another portion and having an outer diameter thereof matching an outer diameter of the central discs (25), and an inner diameter of said first friction disc (18) being slightly greater than an outer diameter of said central area of said one portion of said piston-plate (13), said piston-plate (13) at said first friction disc (18) having a recessed portion (16).

2. A pneumatic brake-clutch assembly according to claim 1, wherein the inner diameter of said first friction disc (18) is roughly the same as the inner diameter of said first ring (22) having friction linings (24) and is substantially smaller than the inner diameter of said cylindrical portion (12) of said brake-side cover (11).

3. A pneumatic brake-clutch assembly according to claim 1, wherein a front side of said narrower axial section (4) of said hub (2) faces said brake-side cover (11) and is provided with projections (6) alternating with recesses (7) defining slots of small depth and large width, said slots constituting inlets for the compressed air which enters from the shaft into said cylindrical cavity.

4. A pneumatic brake-clutch assembly according to claim 1, wherein said central piston-plate (13) has first radial ribs (27) and said clutch-side cover (26–28) has second radial ribs (28), said first radial ribs (27) alternately crossing said second radial ribs (28), said first and second radial ribs defining torque transmitting means from said central piston-plate (13) to said hub (2).

* * * * *